June 12, 1956 H. W. SIMPSON 2,749,773
HYDRODYNAMICALLY DRIVEN PLANETARY TRANSMISSION
Filed Dec. 15, 1951 4 Sheets-Sheet 1

INVENTOR.
Howard W. Simpson

INVENTOR.
Howard W. Simpson

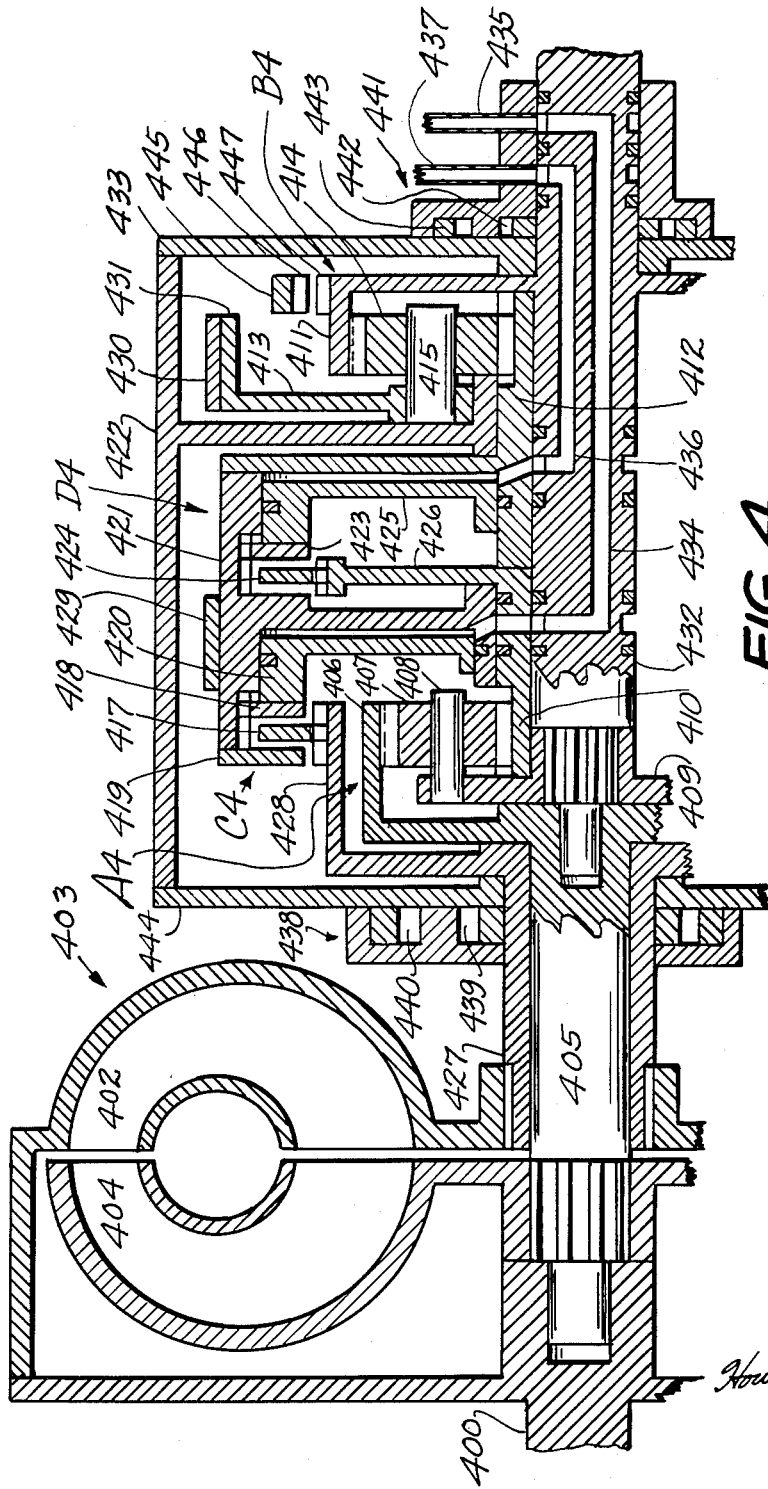

United States Patent Office 2,749,773
Patented June 12, 1956

2,749,773

HYDRODYNAMICALLY DRIVEN PLANETARY TRANSMISSION

Howard W. Simpson, Dearborn, Mich.

Application December 15, 1951, Serial No. 261,821

11 Claims. (Cl. 74—677)

In my co-pending United States patent application 257,549, for a transmission having three speeds forward and one in reverse for use in cooperation with a hydrodynamic device, the latter is never locked out and the drive is always through fluid before reaching the planetary gears. Since a constant loss of power occurs in fluid devices of this kind, the present disclosure is directed to reducing such losses in top or high speed by transmitting part or all of the power directly from the engine to the planetary gears. This locking out of the fluid device is accomplished in the speed which is most used which increases the fuel economy of the vehicle considerably.

An object of this invention is therefore to improve fuel economy with less heat generated in the fluid device, and a simple and efficient transmission for use with a fluid coupling or fluid torque converter.

Another object is to provide a combination of a fluid coupling and a planetary transmission in which, in high speed, there is partial power delivery to the planetary gears through the fluid coupling and partial delivery direct to the planetary gears.

A specific object is to provide, in high speed of a three speed transmission, a clutch connecting the power output member of an automotive engine with the sun gear of an internal-external planetary gear set, while a fluid coupling is used between the engine and the internal ring gear of the same gear set.

Another object is to provide a combination of a fluid torque converter with a planetary transmission in which the converter is completely by-passed in high speed.

A specific object is to provide clutches connecting in high speed an engine with the output shaft of a planetary transmission and a fluid torque converter connecting the engine and the internal ring gear of the planetary transmission.

Other objects will become apparent from the following descriptions and the accompanying simplified drawings which are partial elevations in section of several embodiments of my invention.

Figure 1:
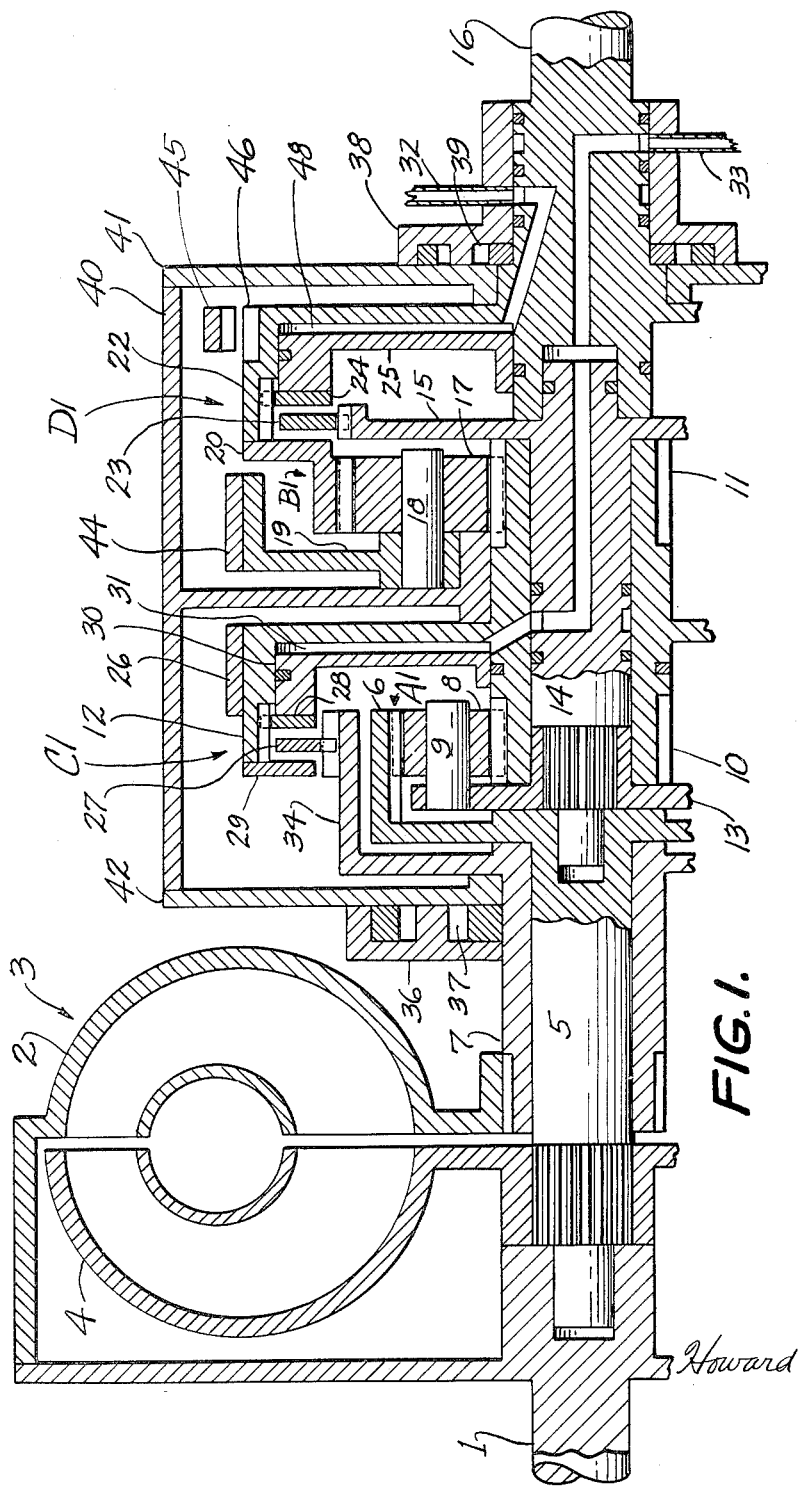
Fig. 1 shows gears, clutches, brakes, oil pumps and a fluid coupling used for one combination.
Figure 2:
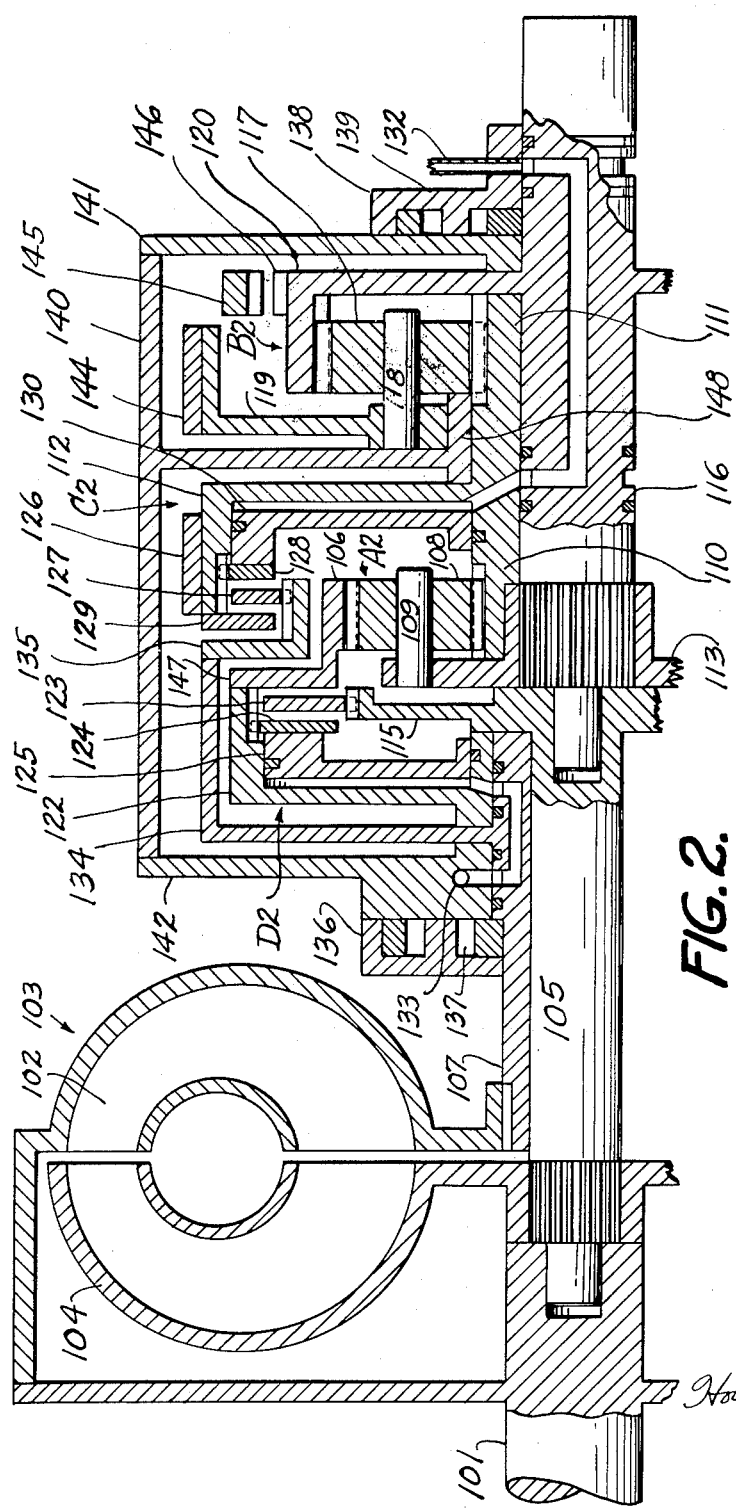
Fig. 2 shows gears, brakes, oil pumps and a fluid coupling similar to those in Fig. 1 but with another arrangement of clutches which accomplishes the same result in each of three speeds and reverse as do the clutches in Fig. 1.
Figure 3:
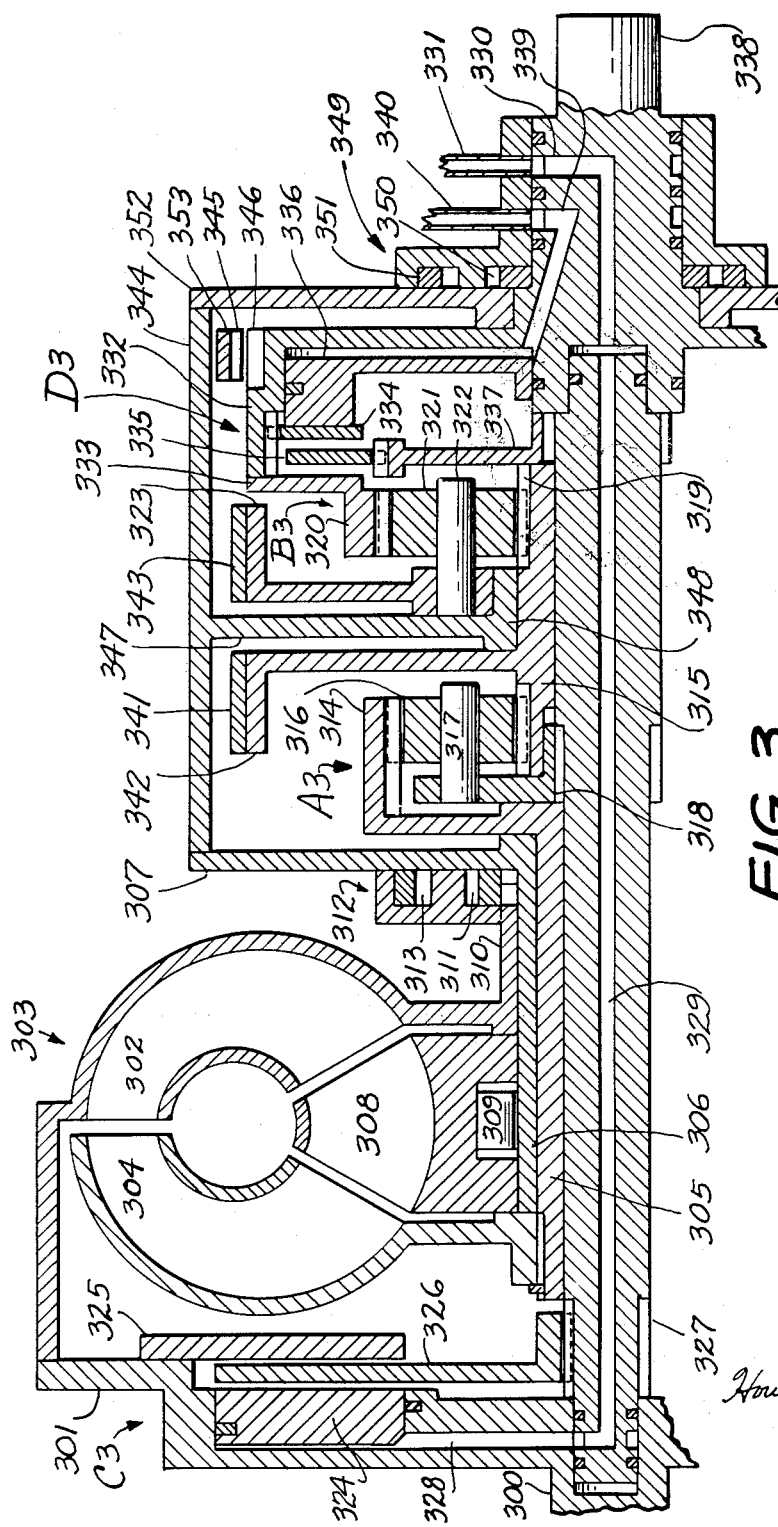

Fig. 3 has the same gear train as Figs. 1 and 2 but a torque converter is used instead of a fluid coupling and one of the clutches is moved to be adjacent to the engine shaft.

Fig. 4 has the same gear train as Figs. 1, 2 and 3 and the same fluid coupling as in Figs. 1 and 2. It differs from Fig. 1 in the location of one of the clutches. Also the two sun gears are not integral as in Fig. 2 and no intermediate shaft is used between the input and output shaft as in Fig. 2.

Referring to Fig. 1, an engine shaft is connected to the pump 2 of a fluid coupling 3. Turbine 4, the output member of the coupling is splined to input shaft 5 which is integral with ring gear 6 of planetary gear set A1. Pump 2 is splined to rotating sleeve 7. Several planet gears 8, one of which is shown journaled on pin 9, mesh with ring gear 6 and sun gear 10 which is integral with sun gear 11 and clutch housing 12. Pin 9 is fixed in carrier 13 which is splined to intermediate shaft 14 which is integral with flange 15 and piloted in output shaft 16 and input shaft 5. Planet gears 17 of gear set B1, one of which is shown journaled on pin 18 fixed in carrier 19, mesh with sun gear 11 and ring gear 20 which is attached to clutch housing 22 of clutch D1. The latter consists of housing 22 enclosing clutch discs 23 and 24, and piston 25 in cylinder 48 which is fed by oil pressure through suitable ducts and grooves from tube 32. Clutch C1 comprises housing 12 (which also is a brake drum for brake band 26), clutch discs 27 and 28, pressure plate 29 and piston 30. Cylinder 31 is fed by oil pressure through suitable ducts and grooves from tube 33. Sleeve 7 is integral with a splined drum 34 which drives clutch disc 27 so that when piston 30 is energized engine shaft 1 is clutched to sun gears 10 and 11. When clutch D1 is engaged intermediate shaft 14 is clutched to output shaft 16.

Engine driven pump 36 has its drive gear 37 keyed to sleeve 7 by a key not shown and output shaft pump 38 has its drive gear 39 keyed to output shaft 16 by a key which is not shown. Housing 40 with flanges 41 and 42 journal sleeve 7, sun gears 10 and 11, and output shaft 16 and provides an enclosure for lubrication. Brake band 26 when applied to brake drum 12 holds sun gears 10 and 11 stationary and sun gear 10 is then a reaction member. Brake band 44 when applied holds carrier 19 as a reaction member. Detent 45 is attached to the housing in such a way that it can be moved to engage teeth 46 in clutch housing 22, for holding stationary the output shaft 16, which is integral with clutch housing 22.

Operation 1

In neutral both clutches and brakes are released and clutch plate 27 turns at engine speed but ring gear 6 turns slightly slower due to fluid slip in coupling 3. Shaft 14 and sun gears 10 and 11 also rotate but since shaft 14 floats between the input shaft 5 and output shaft 16 its speed is less than that of input shaft 5 when output shaft 16 is stationary. This results in low tooth engagement speeds in both gear sets A1 and B1 and also low relative speeds between adjacent clutch discs 27 and 28 and clutch discs 23 and 24.

In low speed brake band 44 is applied and clutch D1 engaged. Carrier 19 is held as a reaction member. Part of the torque from A1 drives the output shaft 16 through intermediate shaft 14 and clutch D1. The remaining torque at gear set A1 is transmitted through gear set B1 to the output shaft 16 from ring gear 20 and clutch housing 22 to which ring gear 20 is attached.

In second speed clutch D1 remains engaged but brake band 26 is applied and brake band 44 released. With sun gear 10 as a reaction member the entire torque is transmitted through gear set A1 intermediate shaft 14 and clutch D1 to output shaft 16 but at a faster speed.

In high both brake bands 26 and 44 are released and clutches C1 and D1 engaged to give a one to one ratio. Clutch C1 transmits a portion of the engine torque to sun gear 10 directly from the engine while the remainder of the engine torque is transmitted through fluid coupling 3 to ring gear 6. The two separate paths of torque are recombined at carrier 13.

In reverse speed clutch C1 is engaged and brake band 44 applied. Carrier 19 is the reaction member while the torque is transmitted entirely through gear set B1, sun gear 11 then being the input member of gear set B1. Since all the input torque is transmitted through clutch C1 in reverse, fluid coupling 3 is not effective in reverse speed ratio. Smooth engagement comparable to that obtained with a fluid coupling is obtained by gradual application of clutch C1. The hydraulic valving and control mechanism necessary for this purpose is not shown as it is not a part of this invention. In reverse speed ring gear 6, carrier 13 and intermediate shaft 14 rotate at engine speed minus a negligible amount due to a slight lag in the speed of ring gear 6 due to fluid coupling slip.

Referring to Fig. 2 engine shaft 101 drives pump 102 of fluid coupling 103. Pump 102 drives turbine 104 and is splined to sleeve 107 which is integral with drum 134 to which splined drum 135 is attached. Turbine 104 is splined to input shaft 105 of the transmission and has flange 115 for driving clutch disc 123. Clutch D2 is energized by pressure through duct 133 and comprises clutch discs 123 and 124, clutch housing 122, piston 125 and pressure plate 147 which is integral with ring gear 106 of gear set A2. Other members of gear set A2 are sun gear 110, carrier 113 and several planet gears 108, one of which is shown journaled on pin 109 fixed in carrier 113, which is splined to output shaft 116. Output shaft 116 is integral with ring gear 120 of gear set B2. Other members of gear set B2 are sun gear 111 which is integral with sun gear 110, carrier 119, and several planet gears 117, one of which is shown journaled on pin 118 fixed in carrier 119. Clutch housing 112 also serves as a brake drum for brake band 126 and is integral with sun gears 110 and 111. Clutch C2 comprises clutch housing 112, clutch discs 127 and 128, pressure plate 129 and piston 130 which is energized by oil pressure entering through tube 132 and suitable ducts and grooves. Brake band 144 can be applied to hold carrier 119 as a reaction member. Hub 148 of housing 140 journals carrier 119. Flanges 141 and 142 attached to housing 140 journal respectively output shaft 116 and sleeve 107. Detent 145 is attached to housing 140 and is engageable with teeth 146 cut on the outside of ring gear 120 to provide a parking lock. Input pump 136 has its drive gear 137 driven by sleeve 107 by means of a key not shown. Output shaft pump 138 has its drive gear 139 driven by output shaft 116 by a key not shown.

*Operation 2*

In neutral in Fig. 2 clutches C2 and D2 and brake bands 126 and 144 are released and input shaft 105 and sleeve 107 turn at input speed but there is no drive to either gear set A2 or B2 except a small torque drag in clutches C2 and D2 which may possibly rotate the gears slowly. In low clutch D2 is engaged and brake band 144 applied and gear sets A2 and B2 are subjected to torque entering at ring gear 106, and carrier 119 becomes a reaction member. Part of the power output is delivered to output shaft 116 from carrier 113 and the remainder from ring gear 120.

In second speed gear set A2 is working and gear set B2 idles. Brake band 144 is released and brake band 126 applied so that sun gear 110 becomes the reaction member.

In high, brake bands 126 and 144 are released and clutches C2 and D2 engaged. Clutch C2 transmits torque directly from the engine to sun gear 110 and clutch D2 transmits the remainder to ring gear 106 and the fractional torques combine at carrier 113 for delivery to the output shaft 116.

In reverse speed clutch C2 connects the entire torque to sun gears 110 and 111 without any of it passing through fluid coupling 103 while turbine 104 rotates idly at slightly less than engine speed due to fluid slip. Ring gear 106 and clutch D2 rotate backward at somewhat less than engine speed resulting in a relative speed of adjacent clutch plates 123 and 124 of less than twice engine speed. Sun gear 111 is the input drive gear of gear set B2 and carrier 119 which is held by brake band 144, becomes the reaction member. Ring gear 120 and output shaft 116 then turn backward at reduced speed. Smooth engagement of reverse comparable to that obtained with the coupling in operation is obtained by gradual application of clutch C2. The controls necessary for this are not shown as they are not a part of this invention.

Referring to Fig. 3, engine shaft 300 and flywheel 301 drive pump 302 of fluid torque converter 303. Turbine 304 is splined to sleeve 305 journaled in hub 306 of end plate 307. Reactor 308 is journaled on hub 306 and free wheel member 309 is biased between reactor 308 and hub 306 to permit only forward rotation of reactor 308. Pump 302 has a hub 310 which drives gear 311 of pump 312 and meshes with gear 313.

Gear set A3 consists of ring gear 314, sun gear 315, carrier 318 and several planet gears 316, one of which is shown journaled on pin 317 fixed in carrier 318. Sun gear 315 is integral with sun gear 319 of gear set B3. Other members of gear set B3 are ring gear 320, carrier 323 and several planet gears 321, one of which is shown journaled on pin 322 fixed in carrier 323.

Clutch C3 comprises piston 324 and pressure plate 325 associated with flywheel 301, and disc 326 splined to shaft 327. Piston 324 engages clutch C3 when pressure enters passage 328 through ducts 329 and 330 and tube 331.

Clutch D3 consists of housing 332, pressure plate 333 which is integral with ring gear 320 and attached to housing 332, discs 334 and 335 and piston 336. Disc 335 is driven by drum 337 which is splined to shaft 327, the latter being piloted in engine shaft 300 and output shaft 338 which is integral with housing 332. Piston 336 engages clutch D3 when pressure enters passage 339 and tube 340.

*Operation 3*

In neutral all clutches and brakes are released and the gears of gear sets A3 and B3 turn under the influence of frictional drag in the fluid of torque converter 303. Shaft 327 rotates slowly due to the frictional drag at clutch C3 and this reduces the tooth engagement speed at gear sets A3 and B3.

In low speed clutch D3 and brake band 343 are engaged and ring gear 314 is driven by turbine 304. Sun gears 315 and 319 rotate backward and shaft 327 and ring gear 320 are driven forward at reduced speed. The torque in shaft 327 joins that of ring gear 320 at clutch D3 and the total torque is transmitted to output shaft 338 at reduced speed.

In second speed clutch D3 remains engaged and brake band 343 is released and brake band 341 applied to hold sun gears 315 and 319. Input torque is again from turbine 304 and to ring gear 314 with sun gear 315 the reaction member and carrier 318 the output member which rotates at reduced speed.

In high speed both clutches C3 and D3 engage. The engine torque then is transmitted from clutch C3 to clutch D3 and bypasses converter 303 and gear sets A3 and B3. Clutch D3 delivers the torque to housing 332 and output shaft 338.

In reverse speed clutch C3 and brake band 343 engage but clutch D3 and brake band 341 are released.

Carrier 318 is driven forward by shaft 327. This turns ring gear 314 forward slightly faster than carrier 318. But due to the action of torque converter 303 ring gear 314 can only rotate faster than carrier 318 by the amount of the slip between turbine 304 and pump 302. This results in sun gears 315 and 319 rotating slower than carrier 318. Thus the cushioning effect of the converter 303 is effective in reverse speed even though clutch C3 is engaged. Carrier 323 is the reaction member in reverse and ring gear 320 and output shaft 338 are therefore driven backward at reduced speed.

Referring to Fig. 4, engine shaft 400 is connected to pump 402 of torque converter 403 and drives turbine 404 which is splined to shift 405 which is journaled in sleeve 427. Ring gear 406 is integral with shaft 405, and meshes with planet gears 407, one of which is shown journaled on pin 408 fixed in carrier 409. Gear set A4 comprises ring gear 406, planet gears 407, sun gear 410, journaled on output shaft 432, and carrier 409. Gear set B4 comprises ring gear 411, sun gear 412, carrier 413 and planet gears 414, one of which is shown journaled on pin 415 fixed in carrier 413. Both carrier 413 and sun gear 412 are journaled on housing 422. Pump 402 is splined to sleeve 427 which integral with drum 428 and drives disc 417. Clutch C4 comprises discs 417 and 418, pressure plate 419, piston 420 and clutch housing 421 which is journaled on sun gear 410 and is attached to sun gear 412. Clutch D4 comprises discs 423 and 424, piston 425 mounted in housing 421. Disc 424 is driven by flange 426 of sun gear 410.

Brake band 429 can be applied to the outside of housing 421 which also serves as a brake drum and brake band 430 can be applied to brake drum 431 which is integral with carrier 413. Carrier 409 is splined to output shaft 432 which is journaled in housing end plate 433 and piloted in shaft 405.

Clutch C4 is engaged by oil pressure entering through passage 434 and tube 435 and pressure is sealed by suitable oil seal rings. Clutch D4 is engaged by oil pressure entering through passage 436 and tube 437 and is sealed by suitable oil seal rings.

Pressure pump 438 comprises gear 439 driven by sleeve 427 by a key not shown, and gear 440.

Pump 441 comprises gear 442 driven by output shaft 432 by a key not shown, and gear 443.

Housing end plate 444 is attached to main housing 422 and journals sleeve 427.

Parking brake detent 445 is attached to main housing 422 and has teeth 446 which are engageable with teeth 447 on outside of ring gear 411.

*Operation 4*

In neutral all clutches and brakes are released. In low speed clutch D4 engages and connects sun gears 410 and 412 which turn backward. Brake band 430 is applied and holds carrier 413 as a reaction member. Carrier 409 and ring gear 411 are driven forward and part of the output torque is transmitted to output shaft 432 from carrier 409 and part from ring gear 411.

In second speed clutch D4 remains engaged but brake band 429 is applied instead of brake band 430. Sun gear 410 is the reaction member and carrier 409 drives output shaft 432 forward.

In high speed both clutches C4 and D4 are engaged which locks up the rotating members in direct drive. In low and second speeds all the input torque at gear set A4 is derived from turbine 404 through input shaft 405 and ring gear 406, but in high speed torque delivery is to two members of gear set A4. The portion to ring gear 406 is from turbine 404 as in low and second speeds but the remainder is from engine shaft 400 and is transmitted through pump 402, sleeve 427, drum 428, and clutches C4 and D4 to sun gear 410.

In reverse speed clutch C4 and brake band 430 are engaged and input torque is through pump 402, sleeve 427, drum 428 and clutch C4 to sun gear 412. Carrier 413 is the reaction member and ring gear 411 and output shaft 432 are driven backward at reduced speed.

I claim:

1. In a multi-speed drive, a power shaft, a fluid turbine driven by the power shaft, a gear train comprising a plurality of planetary gear sets, each set having sun, ring and planet gears and a planet carrier, a driving connection between the output member of the fluid turbine and the ring gear of one of said planetary gear sets, clutch means between the power shaft and the carrier of the same gear set, a load shaft and clutch means between the load shaft and said carrier of the same set, a sun gear meshing with the planet gear of said carrier, said sun gear being drivingly connected to sun gear of a second gear set, the ring gear of the said second gear set being connected to the load shaft, and a brake for holding the carrier of said second set.

2. In a multi-speed drive, a power shaft, a fluid turbine driven by the power shaft, first and second planetary gear sets, each set comprising sun, ring and planet gears and a planet gear carrier, a driving connection between the fluid turbine and the ring gear of the first gear set, a driving connection between the sun gears, a load shaft connected to the ring gear of the second gear set, first clutch means between the carrier of the first gear set and the load shaft, second clutch means between the power shaft and a member of the first gear set, brake means for holding the carrier of the second gear set whereby, when said brake means and first clutch means are engaged, a low speed reduction is obtained between the power shaft and the load shaft and whereby, when both of said clutch means are engaged a direct drive is obtained.

3. In a multi-speed drive, a power shaft, a fluid turbine driven by the power shaft, first and second planetary gear sets, each set comprising sun, ring and planet gears and a planet gear carrier, a driving connection between the fluid turbine and the ring gear of the first gear set, a driving connection between the sun gears, a load shaft connected to the ring gear of the second gear set, first clutch means between the load shaft and the carrier of the first gear set, clutch means between the power shaft and a member of the first gear set, brake means for holding the sun gear of the first gear set whereby, when the brake means is engaged a second speed reduction is obtained between the power shaft and the load shaft and whereby, when both clutch means are engaged and the brake means released a high speed is obtained.

4. In multi-speed drive, a power shaft, a fluid turbine driven by the power shaft, first and second planetary gear sets, each set comprising sun, ring and planet gears and a planet gear carrier, the sun gears being connected together, a load shaft connected to the ring gear of the second gear set, a driving connection between the fluid turbine and the ring gear of the first gear set, a first clutch between the ring gear of the second gear set and the carrier of the first gear set, a second clutch between the power shaft and the carrier of the first gear set, a brake for holding the carrier of the second set whereby, when the brake and said first clutch are engaged, a low speed of the load shaft is obtained and whereby, when both of said clutches are engaged and the brake is released a high speed is obtained.

5. In a multi-speed drive, a power shaft, a fluid turbine driven by the power shaft, first and second planetary gear sets, each set comprising sun, ring and planet gears and a planet gear carrier, the sun gears being connected together, a load shaft connected to the ring gear of the second gear set, a driving connection between the fluid turbine and the ring gear of the first gear set, a first clutch between the ring gear of the second gear set and the carrier of the first gear set, a second clutch between power shaft and the carrier of the first gear set, a brake for holding the sun gears whereby, when the brake and said first clutch are engaged, a second speed of the load shaft is obtained and when the brake is released and both of said clutches are engaged, a high speed is obtained.

6. In a multi-speed planetary gear drive, a power shaft, a load shaft and clutch means for connecting them together, a fluid turbine driven by the power shaft, a first ring gear driven by the fluid turbine, a second ring gear connected to the load shaft, a first planet gear carrier having planet gears meshing with said first ring gear, a second planet gear carrier having planet gears meshing with said second ring gear, a brake for holding the said second carrier, sun gears meshing with the planet gears of said carriers, and a driving connection between said sun gears, said clutch means including a clutch connection between said first carrier and the load shaft.

7. In a multi-speed planetary gear drive, a power shaft, a load shaft, a fluid turbine driven by the power shaft, a first ring gear driven by the fluid turbine, a second ring gear connected to the load shaft, a first planet carrier having planet gears meshing with said first ring gear, a second planet carrier having planet gears meshing with said second ring gear, a brake for holding said second carrier, sun gears meshing with the planet gears of said carriers, a driving connection between the sun gears, a brake for holding the sun gears, a clutch connection between the power shaft and the first planet carrier, and a clutch connection between said first carrier and said second ring gear.

8. The combination set forth in claim 6 and a brake for holding said sun gears.

9. In a multi-speed planetary gear drive, a power shaft, a load shaft, a fluid turbine driven by the power shaft, a first ring gear driven by the fluid turbine, a second ring gear connected to the load shaft, a first planet gear carrier having planet gears meshing with said first ring gear, a second planet gear carrier having planet gears meshing with said second ring gear, a brake for holding said second carrier, sun gears meshing with the planet gears of said carriers, a driving connection between the sun gears, and clutch means connecting the said first carrier to the power shaft and to the load shaft.

10. The combination set forth in claim 9 and a brake for holding the sun gears.

11. In a multi-speed planetary gear drive, a power shaft, a load shaft, a fluid turbine driven by the power shaft, a first ring gear driven by the fluid turbine, a second ring gear connected to the load shaft, a first planet carrier having planet gears meshing with said first ring gear, a second planet carrier having planet gears meshing with said second ring gear, a brake for holding said second carrier, sun gears meshing with the planet gears of said carriers, a driving connection between the sun gears, a brake for holding the sun gears, a clutch connection between said first carrier and the power shaft, and a clutch connection between said first carrier and said second ring gear.

References Cited in the file of this patent

UNITED STATES PATENTS

| | | |
|---|---|---|
| 2,277,214 | Dodge | Mar. 24, 1942 |
| 2,324,713 | McFarland | July 20, 1943 |
| 2,324,733 | Swirl | July 20, 1943 |
| 2,368,865 | Murray | Feb. 6, 1945 |
| 2,518,825 | Simpson | Aug. 15, 1950 |
| 2,550,082 | Orr | Apr. 24, 1951 |